United States Patent
Sheng et al.

(10) Patent No.: US 12,444,813 B2
(45) Date of Patent: Oct. 14, 2025

(54) SECONDARY BATTERY AND ELECTRODE MEMBER THEREOF, BATTERY MODULE, AND RELATED APPARATUS

(71) Applicant: CONTEMPORARY AMPEREX TECHNOLOGY (HONG KONG) LIMITED, Hong Kong (CN)

(72) Inventors: Changliang Sheng, Fujian (CN); Zige Zhang, Fujian (CN); Qingrui Xue, Fujian (CN); Wei Li, Fujian (CN); Jing Li, Fujian (CN); Pengxiang Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 653 days.

(21) Appl. No.: 17/562,928

(22) Filed: Dec. 27, 2021

(65) Prior Publication Data

US 2022/0123443 A1    Apr. 21, 2022

Related U.S. Application Data

(63) Continuation of application No. PCT/CN2020/120341, filed on Oct. 12, 2020.

(30) Foreign Application Priority Data

Oct. 16, 2019 (CN) .......................... 201921737502.7

(51) Int. Cl.
*H01M 50/536* (2021.01)
*H01M 10/0587* (2010.01)

(52) U.S. Cl.
CPC ..... *H01M 50/536* (2021.01); *H01M 10/0587* (2013.01)

(58) Field of Classification Search
None
See application file for complete search history.

(56) References Cited

U.S. PATENT DOCUMENTS

| | | | |
|---|---|---|---|
| 8,734,986 | B2 | 5/2014 | Yamamura et al. |
| 2009/0017376 | A1 | 1/2009 | Yamamura et al. |

(Continued)

FOREIGN PATENT DOCUMENTS

| | | |
|---|---|---|
| CN | 101345322 A | 1/2009 |
| CN | 108963311 A | 12/2018 |

(Continued)

OTHER PUBLICATIONS

International Search Report dated Jan. 12, 2021 issued in PCT/CN2020/120341.

*Primary Examiner* — Carlos Barcena
(74) *Attorney, Agent, or Firm* — Scully, Scott, Murphy & Presser, P.C.

(57) ABSTRACT

A secondary battery and an electrode member thereof, a battery module, and a related apparatus are provided. The electrode member includes a current collector, an active material layer, an adapting sheet, and an electrode lead. The current collector includes an insulating substrate, a first conductive layer, and a second conductive layer. The first conductive layer and the second conductive layer each include a coated region and an uncoated region, the coated region is coated with an active material layer, and the uncoated region is not coated with an active material layer, a size of the current collector in a length direction is larger than that in a width direction, and the uncoated region is located on a side of the coated region in a length direction. The adapting sheet includes a first conductive member and a second conductive member.

10 Claims, 13 Drawing Sheets

(56) References Cited

U.S. PATENT DOCUMENTS

2020/0020952 A1    1/2020  Zhang et al.
2023/0402616 A1 *  12/2023  Kim ..................... H01M 4/661

FOREIGN PATENT DOCUMENTS

| CN | 110335984 | A | | 10/2019 | |
|----|-----------|---|---|---------|---|
| CN | 210805919 | U | | 6/2020 | |
| JP | H10255754 | A | | 9/1998 | |
| JP | 2006260892 | A | | 9/2006 | |
| WO | WO-2017222296 | A1 | * | 12/2017 | ........ H01M 10/0422 |

* cited by examiner

SECONDARY BATTERY AND ELECTRODE MEMBER THEREOF, BATTERY MODULE, AND RELATED APPARATUS

CROSS-REFERENCE TO RELATED APPLICATIONS

This application is a continuation of International Application No. PCT/CN2020/120341, filed on Oct. 12, 2020, which claims priority to Chinese Patent Application No. 201921737502.7, filed with the Chinese Patent Office on Oct. 16, 2019 and entitled "SECONDARY BATTERY AND ELECTRODE MEMBER THEREOF, BATTERY MODULE, AND APPARATUS USING SECONDARY BATTERY AS POWER SOURCE", both of which are hereby incorporated by reference in their entireties.

TECHNICAL FIELD

Embodiments of the present application relates to the field of batteries, and in particular to a secondary battery and an electrode member thereof, a battery module, and a related apparatus.

BACKGROUND

A secondary battery, such as a lithium-ion battery is widely used in an electronic device such as a mobile phone and a notebook computer due to advantages of its high energy density and environmental friendliness. In recent years, in order to deal with environmental issues, gasoline price issues and energy storage issues, the application of lithium-ion batteries has been rapidly extended to gasoline-electric hybrid vehicles, ships, energy storage systems, or the like.

An electrode member of a secondary battery generally includes a current collector and an active material layer coated on a surface of the current collector. In order to improve safety performance of the secondary battery, a current collector with a multi-layer structure is selected for some electrode members, for example, the current collector includes an insulating substrate and conductive layers disposed on two surfaces of the insulating substrate, and an active material layer is coated on surfaces of the conductive layers. However, the two conductive layers are separated by the insulating substrate, and therefore currents in the two conductive layers cannot be converged, which affects a current passing capability of the electrode member.

SUMMARY

In view of the problems existing in the background technologies, various aspects of the present application provide a secondary battery and an electrode member thereof, a battery module, and a related apparatus, which could improve a current passing capability and safety performance of the electrode member.

According to a first aspect of the present application, an electrode member is provided, and the electrode member includes a current collector, an active material layer, an adapting sheet, and an electrode lead. The current collector includes an insulating substrate, a first conductive layer, and a second conductive layer, and the first conductive layer and the second conductive layer are respectively disposed on two surfaces of the insulating substrate. The first conductive layer and the second conductive layer each include a coated region and an uncoated region, the coated region is coated with an active material layer, and the uncoated region is not coated with an active material layer, a size of the current collector in a length direction is larger than that in a width direction, and the uncoated region is located on a side of the coated region in a length direction. The adapting sheet includes a first conductive member and a second conductive member, the first conductive member and the second conductive member are respectively connected to the uncoated region of the first conductive layer and the uncoated region of the second conductive layer, and the first conductive member is connected to the second conductive member. The electrode lead is connected to the adapting sheet, and one end of the electrode lead in the width direction is beyond the uncoated region.

Therefore, a thickness of the conductive layer could be reduced, a risk of short circuit could be reduced, safety performance could be improved, a size limitation of the uncoated region could be reduced, and a current-passing area between the conductive member and the uncoated region could be increased, thereby improving the current passing capability of the electrode member.

In some embodiments, the adapting sheet further includes a connecting portion, and the connecting portion is connected between the first conductive member and the second conductive member. The connecting portion is configured to be bent around an end portion of the uncoated region in the length direction, or the connecting portion is configured to be bent around an end portion of the uncoated region in the width direction. The electrode lead is fixed to the connecting portion by means of welding, bonding and riveting. The connecting portion may connect the first conductive member and the second conductive member, thereby converging currents of the first conductive layer and the second conductive layer together.

In some embodiments, the electrode lead is connected to the first conductive member, and the electrode lead is not beyond the uncoated region in the length direction.

In some embodiments, a thickness of the electrode lead is greater than a thickness of the first conductive member.

In some embodiments, the uncoated region of the first conductive layer is located at an end portion of the first conductive layer in a length direction. The uncoated region of the second conductive layer is located at an end portion of the second conductive layer in a length direction.

In some embodiments, a number of the uncoated regions of the first conductive layer is plural, and a plurality of uncoated regions of the first conductive layer include a first uncoated region and a second uncoated region. A number of the uncoated regions of the second conductive layer is plural, and a plurality of uncoated regions of the second conductive layer include a third uncoated region and a fourth uncoated region;

a number of the adapting sheets is plural, and a plurality of adapting sheets include a first adapting sheet and a second adapting sheet;

the first conductive member of the first adapting sheet is connected to the first uncoated region of the first conductive layer, and the second conductive member of the first adapting sheet is connected to the third uncoated region of the second conductive layer. The first conductive member of the second adapting sheet is connected to the second uncoated region of the first conductive layer, and the second conductive member of the second adapting sheet is connected to the fourth uncoated region of the second conductive layer. At least one of the first adapting sheet and the second adapting sheet is connected to the electrode lead. A conductive path between the first conductive layer and the second conductive layer may be increased by the plurality of adapting sheets, which improves a current-converging capability.

In some embodiments, the first uncoated region and the second uncoated region are respectively located at two ends of the first conductive layer in a length direction. The third uncoated region and the fourth uncoated region are respectively located at two ends of the second conductive layer in a length direction.

According to a second aspect of the present application, a secondary battery is provided, including an electrode assembly, and the electrode assembly including a separator and the electrode member. The separator separates a positive electrode member from a negative electrode member to avoid a short circuit.

In some embodiments, the separator and the electrode member are wound into an integral body along a central axis parallel to the width direction. In the width direction, the separator is beyond the adapting sheet.

According to a third aspect of the present application, a battery module is provided, including the secondary battery, a number of the secondary batteries being plural.

According to a fourth aspect of the present application, an apparatus using a secondary battery as a power source is provided, including a main body and a plurality of secondary batteries, and the plurality of secondary batteries being provided in the main body.

According to the foregoing secondary battery and the electrode member thereof, the battery module, and the related apparatus, the thickness of the conductive layer could be reduced by providing the insulating substrate. When a foreign matter pierces the electrode member of the secondary battery, due to the thinner thickness of the conductive layer, burrs generated at the part of the conductive layer pierced by the foreign matter are small, and it is difficult to pierce the separator, thereby reducing the risk of short circuit and improving safety performance. The first conductive member and the second conductive member of the adapting sheet can converge the currents in the first conductive layer and the second conductive layer together, thereby improving the current passing capability of the electrode member. The uncoated region and the coated region of the conductive layer are disposed in a length direction, which could reduce the size limitation of the uncoated region and increase the current-passing area between the conductive member and the uncoated region, thereby improving the current passing capability of the electrode member.

BRIEF DESCRIPTION OF THE DRAWINGS

In order to illustrate technical solutions in embodiments of the present application or in the prior art more clearly, brief description will be made below to the accompanying drawings required in the embodiments or the prior art. Apparently, the accompanying drawings described below are only some embodiments of the present application, and other accompanying drawings can be obtained based on these drawings by persons of ordinary skills in the art without inventive efforts.

Reference signs are explained as follows:

| | |
|---|---|
| 1 electrode member | 2 separator |
| 11 current collector | 3 housing |
| 111 insulating substrate | 4 top cover plate |
| 112 first conductive layer | 5 electrode terminal |
| 113 second conductive layer | 6 electrode assembly |
| 114 coated region | 7 secondary battery |
| 115 uncoated region | W1 first welding zone |
| 115a first uncoated region | W2 second welding zone |

| | |
|---|---|
| 115b second uncoated region | W3 third welding zone |
| 115c third uncoated region | W4 fourth welding zone |
| 115d fourth uncoated region | X length direction |
| 12 active material layer | Y width direction |
| 13 adapting sheet | Z thickness direction |
| 131 first conductive member | |
| 132 second conductive member | |
| 133 connection portion | |
| 13a first adapting sheet | |
| 13b second adapting sheet | |
| 14 electrode lead | |

DESCRIPTION OF EMBODIMENTS

To make the objectives, technical solutions and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first", "second", "third", or the like are merely intended for a purpose of description, and shall not be understood as an indication or implication of relative importance. The term "a plurality of" refers to more than two (including two). Unless otherwise specified or illustrated, the term "connection" should be understood broadly, for example, the "connection" may either be a fixed connection, or a detachable connection, or an integrated connection, or an electrical connection, or a signal connection; and the "connection" may either be a direct connection, or an indirect connection through an intermediary. Persons of ordinary skills in the art may appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further described below in detail through the specific embodiments with reference to the accompanying drawings.

Figure 32:
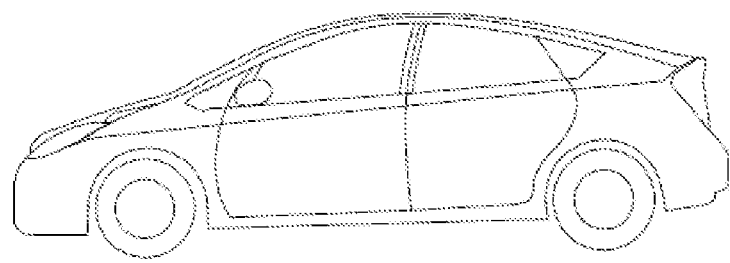
FIG. 32 is a schematic diagram of an apparatus using a secondary battery as a power source according to an embodiment of the present application.

According to the present application, an apparatus using a secondary battery as a power source is provided, including a main body and a plurality of secondary batteries 7, and the plurality of secondary batteries 7 being provided in the main body. The apparatus may be a ship, a vehicle, or the like. For example, with reference to FIG. 32, the vehicle is a new energy vehicle, which may be a battery electric vehicle, a hybrid electric vehicle or an extended-range electric vehicle. The main body of the vehicle is provided with a driving motor, the driving motor is electrically connected to a secondary battery 7 and the secondary battery 7 provides electric energy. The driving motor is connected to wheels in the main body of the vehicle through a transmission mechanism, thereby driving the vehicle to travel. The secondary battery 7 is a lithium-ion battery.

Figure 31:
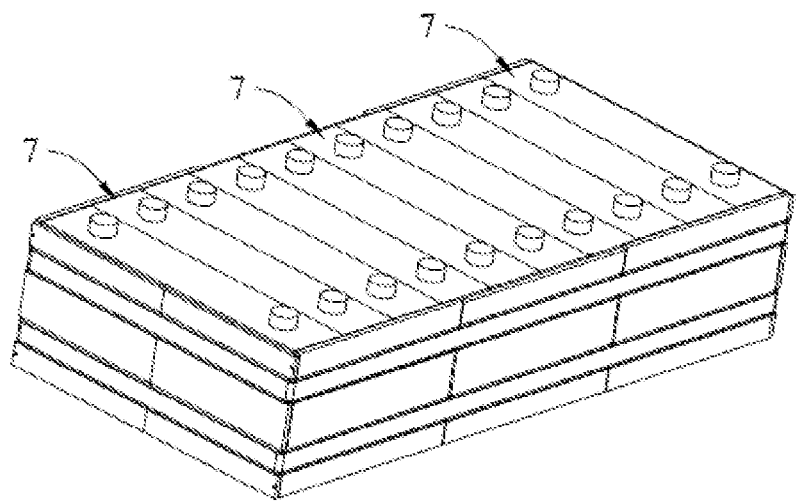
FIG. 31 is a schematic diagram of a battery module according to an embodiment of the present application.

The present application also provides a battery module. With reference to FIG. 31, the battery module includes a plurality of secondary batteries 7, and the plurality of secondary batteries 7 are arranged in sequence. The battery module may also include an end plate and a side plate. There are two end plates, which are respectively disposed at two ends of the plurality of secondary batteries 7 in an arrangement direction, and there are two side plates, which are respectively disposed on two sides of the plurality of secondary batteries 7. The two end plates and the two side plates are connected together to form a substantially rectangular frame capable of accommodating and fixing the plurality of secondary batteries 7.

Figure 1:
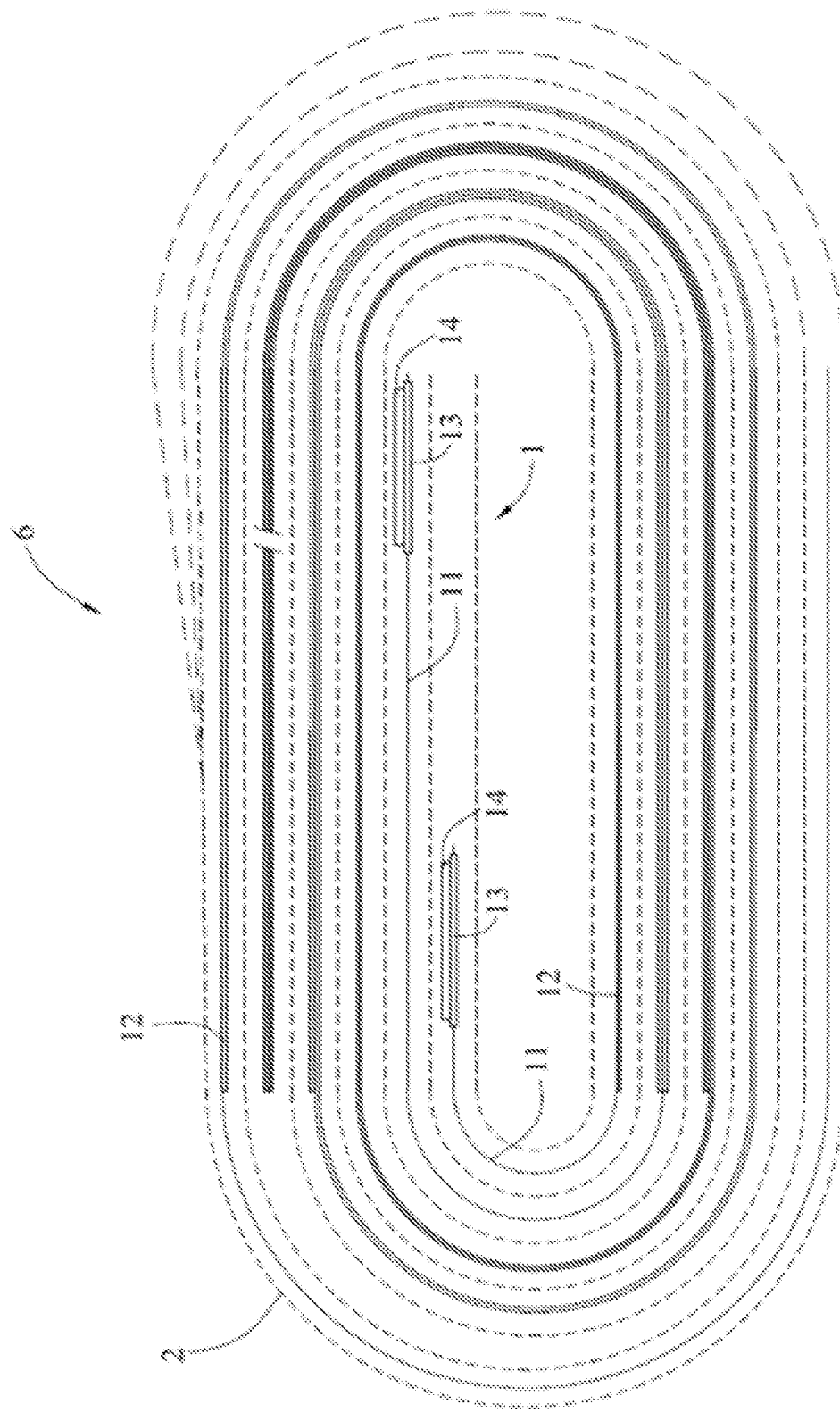
FIG. 1 is a schematic diagram of an embodiment of an electrode assembly of a secondary battery according to the present application.

The secondary battery 7 of the embodiment of the present application includes an electrode assembly 6. The electrode assembly 6 is a core component of the secondary battery 7 for achieving charging and discharging functions. With reference to FIG. 1, an electrode assembly 6 includes an electrode member 1 and a separator 2. There are a plurality of electrode members 1, the plurality of electrode members 1 include a positive electrode member and a negative electrode member, and the separator 2 separates the positive electrode member from the negative electrode member.

In some embodiments, the electrode assembly 6 has a wound structure. Specifically, with reference to FIG. 1, the positive electrode member, the negative electrode member, and the separator 2 all have a belt-like structure, and the positive electrode member, the separator 2, and the negative electrode member are sequentially stacked and wound for more than two turns to form the electrode assembly 6, and the electrode assembly 6 is in a flat shape.

In an alternative embodiment, the electrode assembly 6 has a laminated structure. Specifically, a plurality of positive electrode members and a plurality of negative electrode members are provided, and the plurality of positive electrode members and the plurality of negative electrode members are alternately stacked, and a separator 2 separates the adjacent positive and negative electrode members.

The secondary battery 7 of the present application may be a pouch battery, and the electrode assembly 6 of the pouch battery is directly packaged in a packaging bag. The packaging bag may be an aluminum-plastic film.

Figure 30:
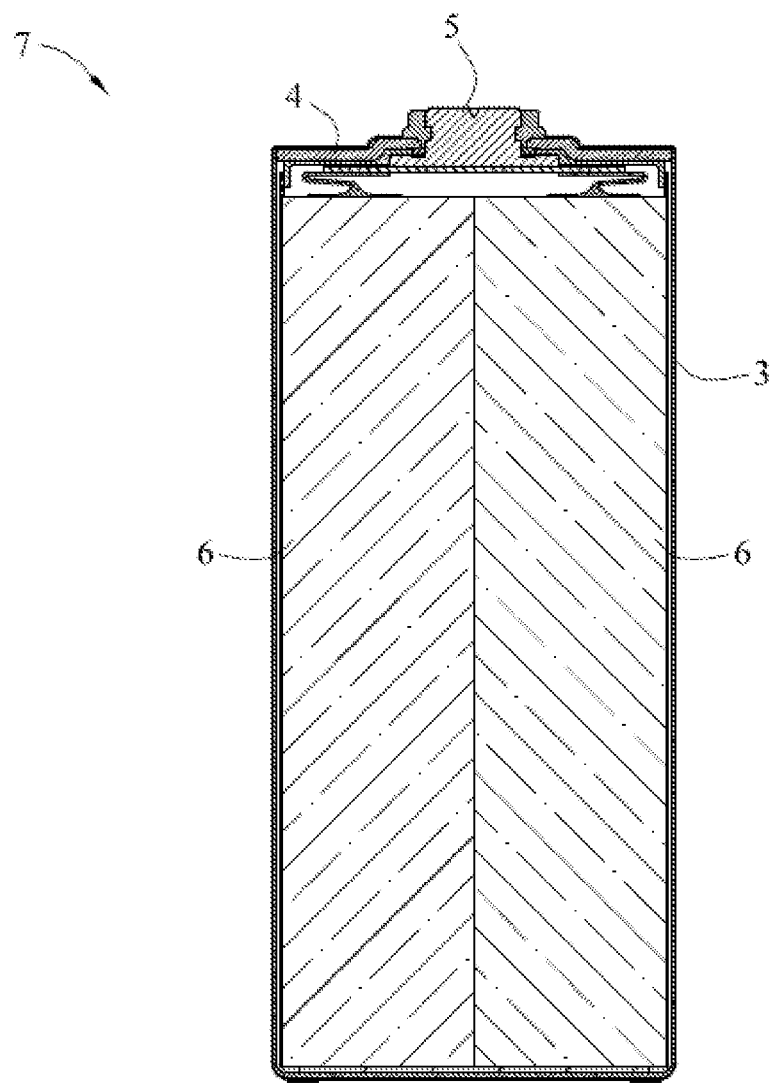
FIG. 30 is a schematic diagram of a secondary battery according to an embodiment of the present application.

The secondary battery 7 of the present application may also be a hard shell battery. With reference to FIG. 30, a hard shell battery further includes a housing 3, a top cover plate 4 and an electrode terminal 5. The housing 3 may have a hexahedral shape or another shape. An accommodating cavity is formed inside the housing 3 to accommodate the electrode assembly 6 and an electrolytic solution. An opening is formed at one end of the housing 3, and the electrode assembly 6 may be placed into the accommodating cavity of the housing 3 via the opening. The housing 3 may be made of conductive metal materials such as aluminum or aluminum alloy. The top cover plate 4 may be connected to the housing 3 by welding or the like so as to cover the opening of the housing 3 to enclose the electrode assembly 6 in the housing 3. The electrode terminal 5 is provided on the top cover plate 4 and electrically connected to the electrode member 1.

Hereinafter, an electrode member 1 of the present application will be described in detail with different embodiments.

Figure 2:
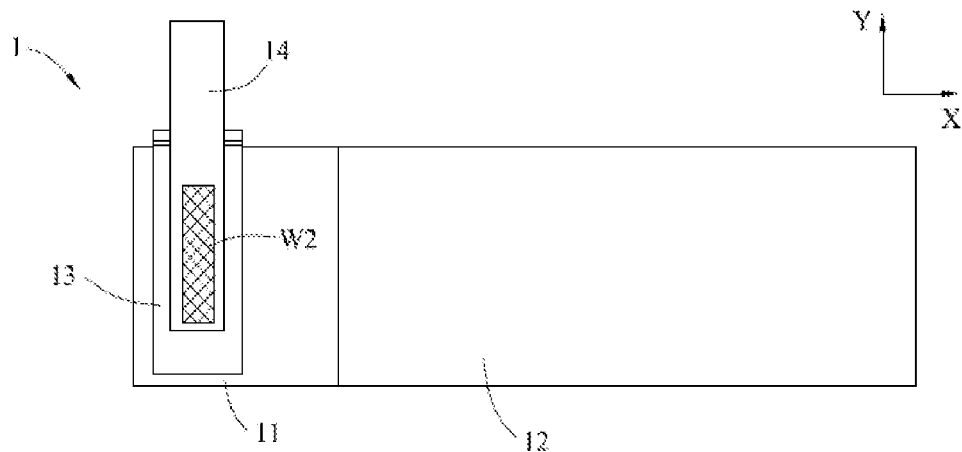
FIG. 2 is a schematic diagram of a first embodiment of an electrode member according to the present application.
Figure 3:
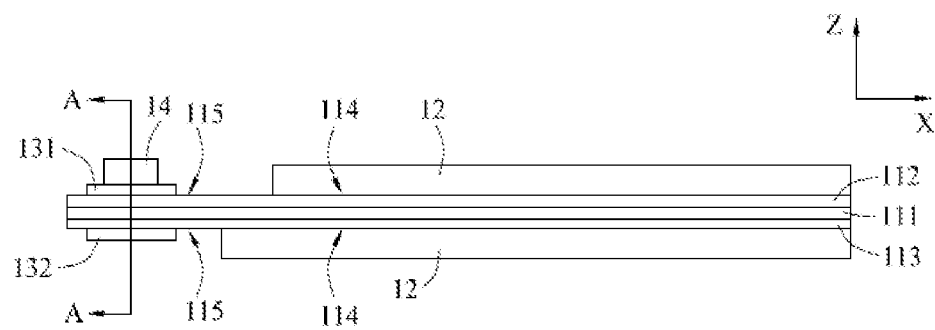
FIG. 3 is a front view of the electrode member of FIG. 2.
Figure 4:
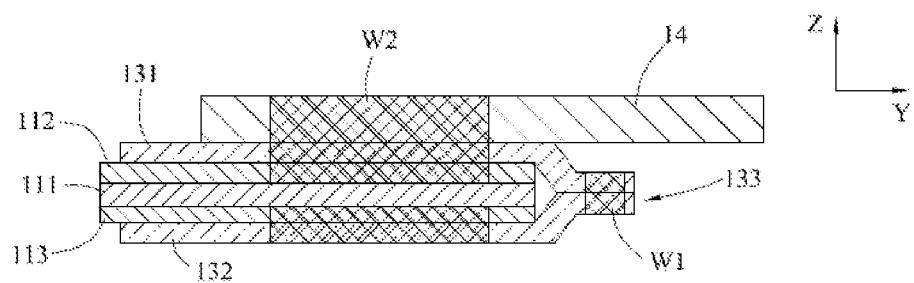
FIG. 4 is a sectional view of the electrode member of FIG. 3 taken along a line A-A.

FIG. 2 is a schematic diagram of a first embodiment of an electrode member according to the present application. FIG. 3 is a front view of the electrode member of FIG. 2. FIG. 4 is a sectional view of the electrode member of FIG. 3 taken along a line A-A.

With reference to FIGS. 2 to 4, in a first embodiment, an electrode member 1 includes a current collector 11, an active material layer 12, an adapting sheet 13, and an electrode lead 14.

The current collector 11 includes an insulating substrate 111, a first conductive layer 112, and a second conductive layer 113, and the first conductive layer and the second conductive layer are respectively disposed on two surfaces of the insulating substrate. A material of the insulating substrate 111 may be a polyethylene terephthalate (PET) film or a polypropylene (PP) film.

The current collector 11 may have a belt-like structure, and a size of the current collector 11 in a length direction X is larger than that in a width direction Y. In a wound-type electrode assembly 6, the separator 2 and the electrode member 1 are wound into an integral body along a central axis parallel to the width direction Y.

The material of the first conductive layer 112 and the second conductive layer 113 is selected from at least one of metal conductive materials and carbon-based conductive materials. The metal conductive materials are, for example, at least one of aluminum, copper, nickel, titanium, silver, nickel-copper alloy and aluminum-zirconium alloy, and the carbon-based conductive materials are, for example, at least one of graphite, acetylene black, graphene and carbon nanotubes.

The first conductive layer 112 may be formed on a surface of the insulating substrate 111 by at least one of vapor deposition and electroless plating. The vapor deposition is, in some embodiments, physical vapor deposition (PVD), such as thermal evaporation deposition. Similarly, the second conductive layer 113 is formed on a surface of the insulating substrate 111 by at least one of vapor deposition and electroless plating.

The active material layer 12 may be disposed on a surface of the first conductive layer 112 and a surface of the second conductive layer 113 by means coating. Active materials (such as lithium manganate, lithium iron phosphate), binders, conductive agents and solvents may be made into a slurry, and then the slurry is coated on the surface of the first conductive layer 112 and the surface of the second conductive layer 113, and the active material layer 12 is formed after the slurry is cured.

The active material layer 12 only covers a partial region of the first conductive layer 112 and a partial region of the second conductive layer 113. Specifically, the first conductive layer 112 and the second conductive layer 113 each include a coated region 114 and an uncoated region 115, the coated region 114 is coated with an active material layer 12 and the uncoated region 115 is not coated with the active material layer 12.

A thickness of the insulating substrate 111 may be 1 micrometer (μm) to 20 μm, and a thicknesses of the first conductive layer 112 and the second conductive layer 113 may be 0.1 μm to 10 μm. Since the first conductive layer 112 and the second conductive layer 113 are relatively thin, burrs generated on the first conductive layer 112 and the second conductive layer 113 are small in a process of cutting the electrode member 1, and it is difficult to pierce the separator 2 with a diameter of ten and several micrometers, thereby avoiding a short circuit and improving safety performance. In some embodiments, when a foreign matter pierces the electrode member 1 of the secondary battery 7, due to the thinner thickness of the first conductive layer 112 and the second conductive layer 113, burrs generated at the parts of the first conductive layer 112 and the second conductive layer 113 pierced by the foreign matter are small, and it is difficult to pierce the separator 2, thereby avoiding the short circuit and improving safety performance.

The adapting sheet 13 includes a first conductive member 131 and a second conductive member 132, the first conductive member 131 and the second conductive member 132 are respectively connected to the uncoated region 115 of the first conductive layer 112 and the uncoated region 115 of the second conductive layer 113, and the first conductive member 131 is connected to the second conductive member 132. The first conductive member 131 and the second conductive member 132 can converge the currents in the first conductive layer 112 and the second conductive layer 113 together, thereby improving the current passing capability of the electrode member 1.

A size of the electrode member 1 in a width direction Y is small, and if the uncoated region 115 is set to one side of the coated region 114 in a width direction Y, the size of the uncoated region 115 in a width direction Y is also small. When the first conductive member 131 is connected to the uncoated region 115 of the first conductive layer 112, a current-passing area between the first conductive member 131 and the uncoated region 115 is small, resulting in a low current passing capability of the electrode member 1.

Similarly, a current-passing area between the second conductive member 132 and the uncoated region 115 of the second conductive layer 113 is also small.

Therefore, in the present application, the uncoated region 115 is located on a side of the coated region 114 in a length direction X in some embodiments. At this time, the uncoated region 115 and the coated region 114 may have the same width, and therefore, according to the present application, the current-passing area between the first conductive member 131 and the uncoated region 115 and the current-passing area between the second conductive member 132 and the uncoated region 115 of the second conductive layer 113 may be increased, thereby improving the current passing capability of the electrode member 1.

The electrode lead 14 is connected to the adapting sheet 13, and one end of the electrode lead 14 in the width direction Y is beyond the uncoated region 115. A portion of the electrode lead 14 beyond the uncoated region 115 can be electrically connected to an electrode terminal 5, so as to draw the current of the electrode member 1 out the outside of the secondary battery 7.

The adapting sheet 13 further includes a connecting portion 133, and the connecting portion 133 is connected between the first conductive member 131 and the second conductive member 132. The connecting portion 133 is configured to be bent around an end portion of the uncoated region 115 in the width direction Y. The adapting sheet 13 may be formed by connecting two metal foils, the two metal foils each includes a first region and a second region, the first regions of the two metal foils are respectively in contact with the first conductive layer 112 and the second conductive layer 113, and the second regions of the two metal foils both are beyond the current collector 11 in the width direction Y, and the second regions of the two metal foils are welded together to form a first welding zone W1.

The first region of one metal foil is the first conductive member 131, the first region of the other metal foil is the second conductive member 132, and the second regions of the two metal foils form the connecting portion 133.

The connecting portion 133 may connect the first conductive member 131 and the second conductive member 132, thereby converging currents of the first conductive layer 112 and the second conductive layer 113 together.

The electrode lead 14 is fixed to the first conductive member 131 by means of welding, bonding and riveting. In some embodiments, the electrode lead 14, the first conductive member 131 and the first conductive layer 112 are welded to form a second welding zone W2. At this time, the electrode lead 14, the first conductive member 131, and the first conductive layer 112 may be connected together by welding once.

The electrode lead 14 is not beyond the uncoated region 115 in the length direction X. At this time, in the length direction X, the electrode lead 14 does not occupy additional space.

The current on the electrode lead 14 is generally larger than that on the first conductive member 131, and therefore in order to ensure the consistency of the current passing, the thickness of the electrode lead 14 is greater than the thickness of the first conductive member 131. In some embodiments, an increase of the thickness of the electrode lead 14 may also reduce resistance and heat generation.

In the pouch battery, the electrode lead 14 passes out of the packaging bag to be electrically connected to other members, thereby realizing the charging and discharging of the secondary battery 7. The electrode lead 14 with a thicker thickness may facilitate an electrical connection between the secondary battery 7 and other members.

The uncoated region 115 of the first conductive layer 112 is located at an end portion of the first conductive layer 112 in the length direction X; and the uncoated region 115 of the second conductive layer 113 is located at an end portion of the second conductive layer 113 in the length direction X. With reference to FIG. 1, after the electrode member 1 is wound and formed, the electrode lead 14 is close to the winding center of the electrode assembly 6; and in the pouch battery, the electrode lead 14 may pass out of the packaging bag without bending.

In the electrode assembly 6, the separator 2 separates a positive electrode member and a negative electrode member to avoid a short circuit. In a width direction Y, if the adapting sheet 13 of the positive electrode member is beyond the separator 2, the portion of the positive electrode member beyond the separator 2 is easily bent and comes into contact with the negative electrode member, thereby causing a short circuit risk. Similarly, if the adapting sheet 13 of the negative electrode component is beyond the separator 2, it will also cause a short circuit risk. Therefore, in the electrode assembly 6 of the present application, in the width direction Y, the separator 2 is beyond the adapting sheet 13.

Hereinafter, a second embodiment of an electrode member of the present application will be described. To simplify the description, only differences between other embodiments and the first embodiment will be mainly introduced below, and the parts not described may be understood with reference to the first embodiment.

Figure 5:
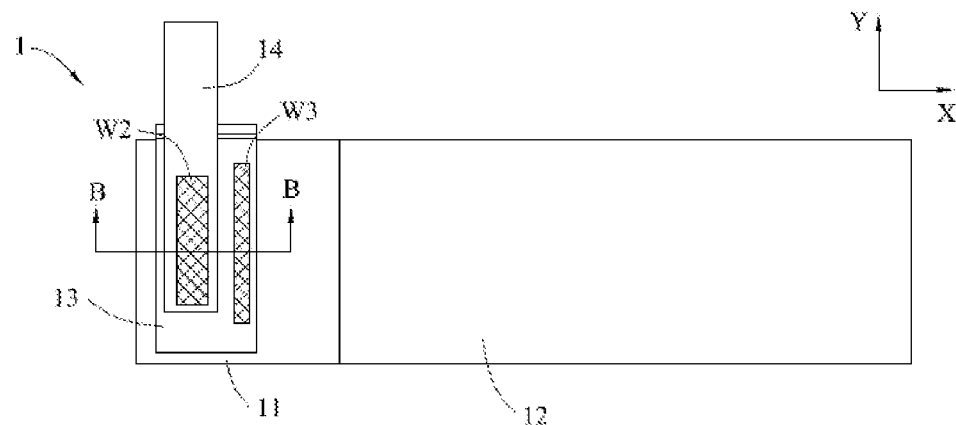
FIG. 5 is a schematic diagram of a second embodiment of an electrode member according to the present application.
Figure 6:
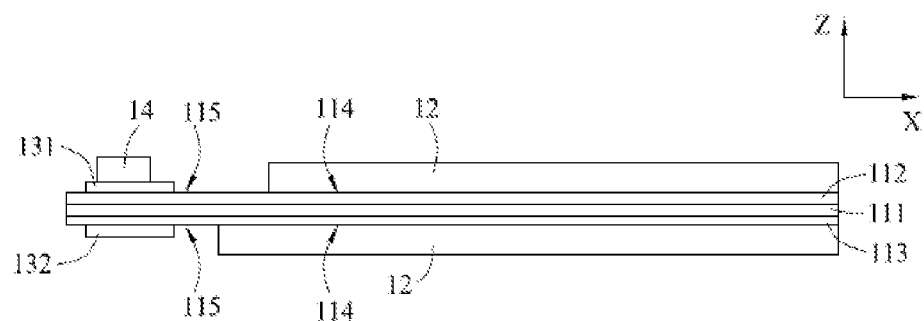
FIG. 6 is a front view of the electrode member of FIG. 5.
Figure 7:
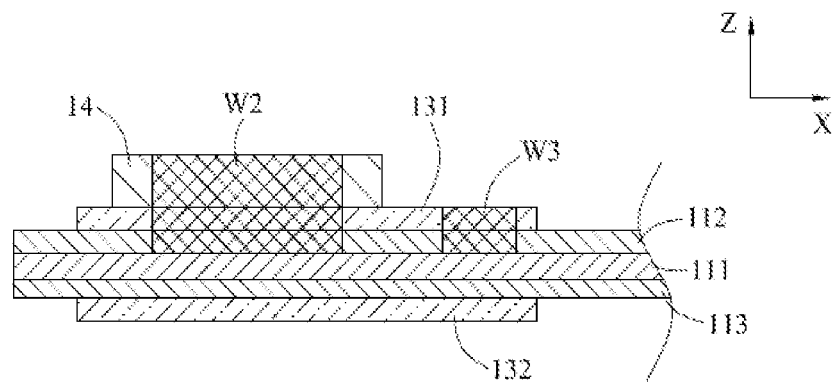
FIG. 7 is a sectional view of the electrode member of FIG. 5 taken along a line B-B.

FIG. 5 is a schematic diagram of a second embodiment of an electrode member according to the present application. FIG. 6 is a front view of the electrode member of FIG. 5. FIG. 7 is a sectional view of the electrode member of FIG. 5 taken along a line B-B.

With reference to FIGS. 5 to 7, compared with the first embodiment, in a second embodiment, a first conductive member 131 and a first conductive layer 112 are welded to form a third welding zone W3. By setting the third welding zone W3, the current-passing area between the first conductive member 131 and the first conductive layer 112 may be further increased, which could reduce resistance and heat concentration. The third welding zone W3 has a strip shape, and the number thereof may be one or more.

Figure 8:
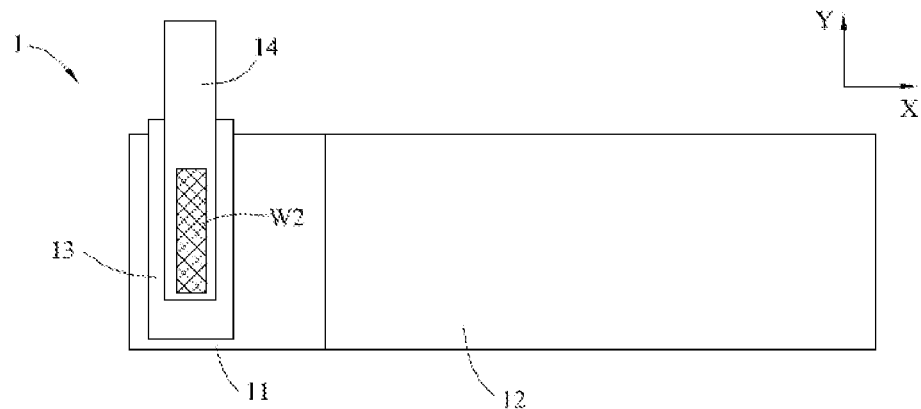
FIG. 8 is a schematic diagram of a third embodiment of an electrode member according to the present application.
Figure 9:
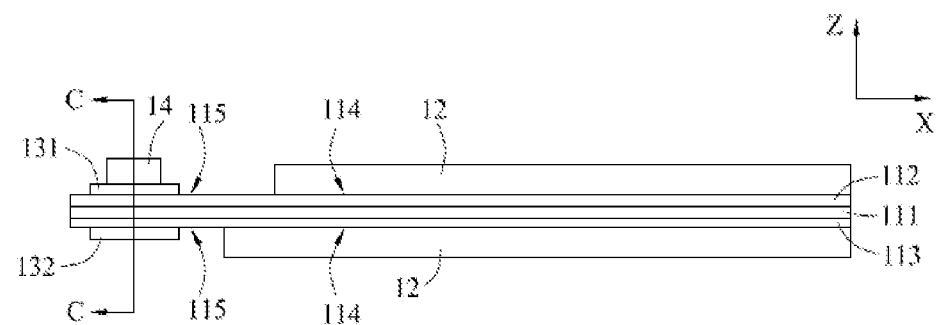
FIG. 9 is a front view of the electrode member of FIG. 8.
Figure 10:
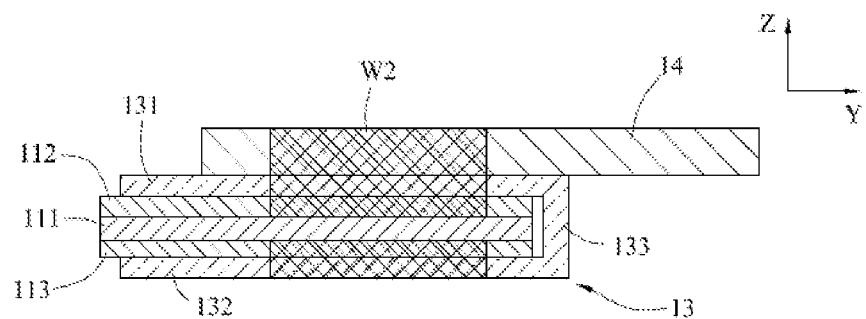
FIG. 10 is a sectional view of the electrode member of FIG. 9 taken along a line C-C.

FIG. 8 is a schematic diagram of a third embodiment of an electrode member according to the present application. FIG. 9 is a front view of the electrode member of FIG. 8. FIG. 10 is a sectional view of the electrode member of FIG. 9 taken along a line C-C.

With reference to FIGS. 8 to 10, compared with the first embodiment, in a third embodiment, an adapting sheet 13 is an integral member. The adapting sheet 13 is formed by bending a metal foil. Specifically, a metal foil is bent into a U-shaped structure and cladded on a current collector 11. A region of one metal foil in contact with a first conductive layer 112 forms a first conductive member 131, a region of one metal foil in contact with a second conductive layer 113 forms a second conductive member 132, and a region of one metal foil located at the outer side of the current collector 11 in a width direction Y forms a connecting portion 133.

Compared with the first embodiment, the welding process could be reduced by using the integrated adapting sheet 13.

Figure 11:
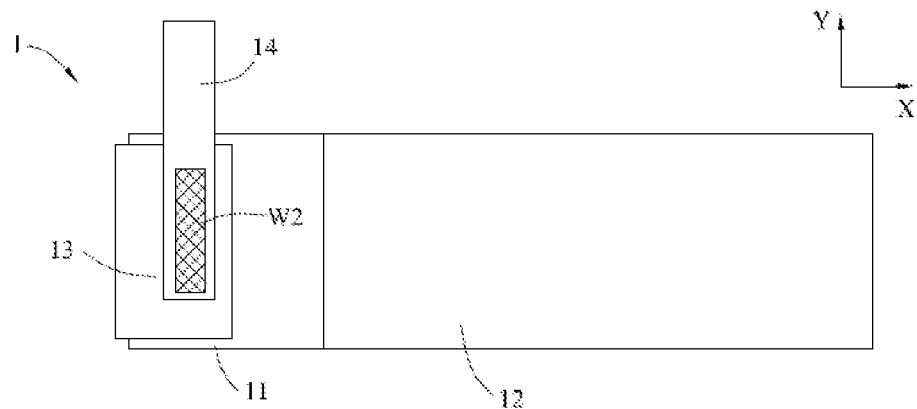
FIG. 11 is a schematic diagram of a fourth embodiment of an electrode member according to the present application.
Figure 12:
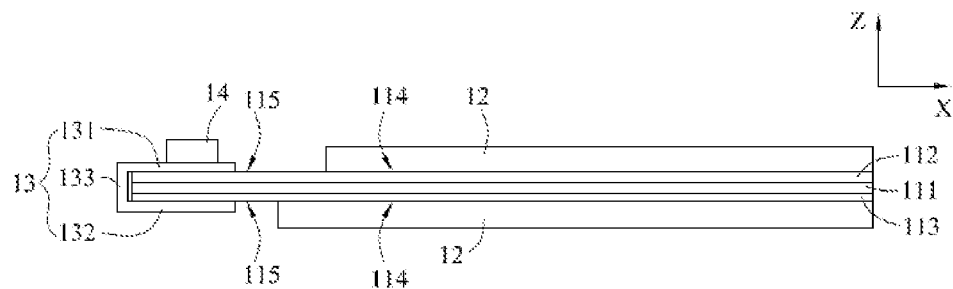
FIG. 12 is a front view of the electrode member of FIG. 11.

FIG. 11 is a schematic diagram of a fourth embodiment of an electrode member according to the present application. FIG. 12 is a front view of the electrode member of FIG. 11.

With reference to FIGS. 11 and 12, compared with the third embodiment, in a fourth embodiment, a connecting portion 133 of an adapting sheet 13 is located on an outer side of a current collector 11 in a length direction X. At this time, the connecting portion 133 is configured to be bent around an end portion of an uncoated region 115 in a length direction X.

In an electrode assembly 6, an electrode member 1 is generally in a wound state. A size of the electrode member 1 in a width direction Y is more precious than the size of the electrode member 1 in a length direction X. In other words, the size of the electrode member 1 in the width direction Y has a greater influence on a volume of the electrode assembly 6.

In the fourth embodiment, the connecting portion 133 occupies space in the length direction X; and after the electrode member 1 is wound and formed, the connecting portion 133 has less influence on the volume of the electrode assembly 6. Therefore, compared with the third embodiment, in the fourth embodiment, the volume of the electrode assembly 6 could be reduced and the energy density could be improved.

Figure 13:
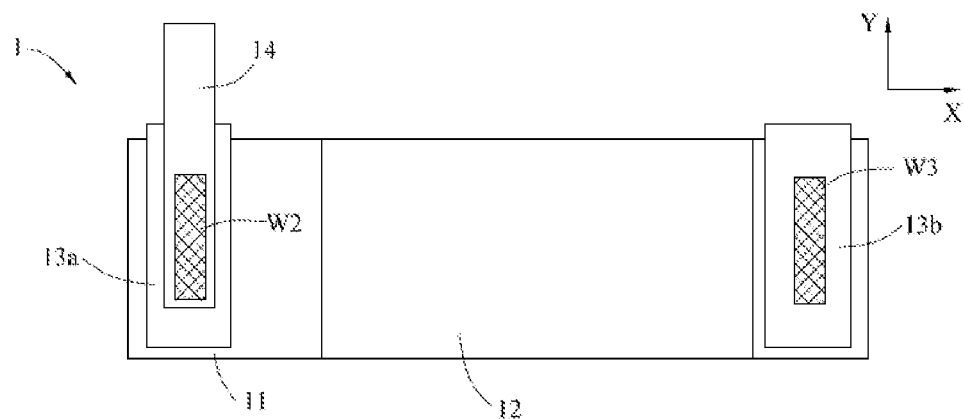
FIG. 13 is a schematic diagram of a fifth embodiment of an electrode member according to the present application.
Figure 14:
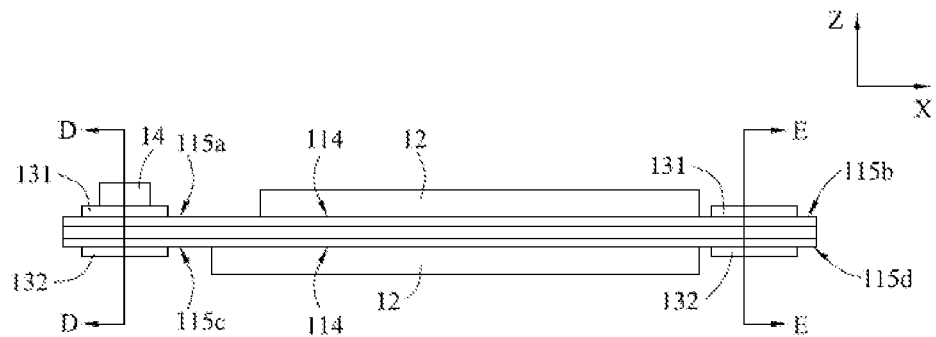
FIG. 14 is a front view of the electrode member of FIG. 13.
Figure 15:
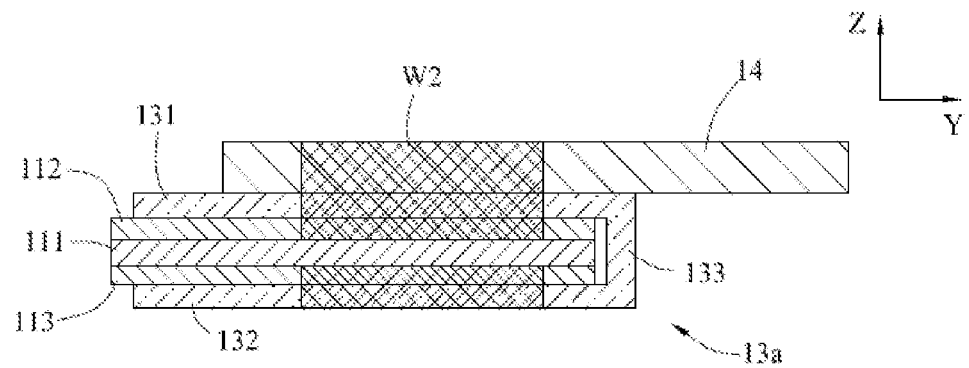
FIG. 15 is a sectional view of the electrode member of FIG. 14 taken along a line D-D.
Figure 16:
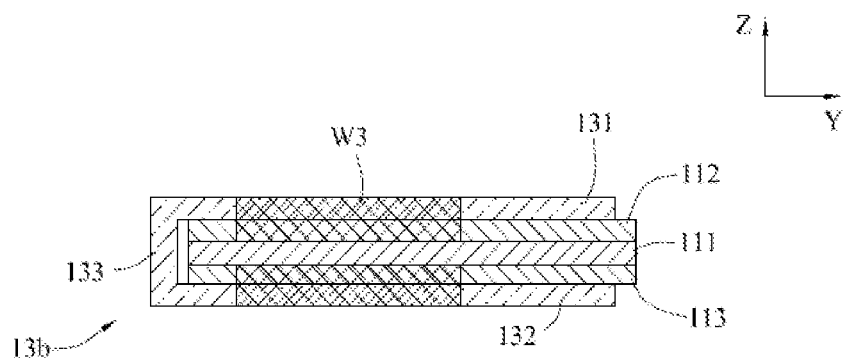
FIG. 16 is a sectional view of the electrode member of FIG. 14 taken along a line E-E.

FIG. 13 is a schematic diagram of a fifth embodiment of an electrode member according to the present application. FIG. 14 is a front view of the electrode member of FIG. 13. FIG. 15 is a sectional view of the electrode member of FIG. 14 taken along a line D-D. FIG. 16 is a sectional view of the electrode member of FIG. 14 taken along a line E-E.

With reference to FIGS. 13-16, in the fifth embodiment, there are a plurality of uncoated regions 115 of a first conductive layer 112, and there may be one or more coated regions 114 of the first conductive layer 112. In the first conductive layer 112, the uncoated region 115 and the coated region 114 are alternately arranged in a length direction X.

There are a plurality of uncoated regions 115 of a second conductive layer 113, and there may be one or more coated regions 114 of the second conductive layer 113. In the second conductive layer 113, the uncoated region 115 and the coated region 114 are alternately arranged in a length direction X.

The plurality of uncoated regions 115 of the first conductive layer 112 include a first uncoated region 115*a* and a second uncoated region 115*b*, and the plurality of uncoated regions 115 of the second conductive layer 113 include a third uncoated region 115*c* and a fourth uncoated region 115*d*.

The number of the adapting sheets 13 is plural, and a plurality of adapting sheets 13 include a first adapting sheet 13*a* and a second adapting sheet 13*b*. The first conductive member 131 of the first adapting sheet 13*a* is connected to the first uncoated region 115*a* of the first conductive layer 112, and the second conductive member 132 of the first adapting sheet 13a is connected to the third uncoated region 115c of the second conductive layer 113. The first conductive member 131 of the second adapting sheet 13b is connected to the second uncoated region 115b of the first conductive layer 112, and the second conductive member 132 of the second adapting sheet 13b is connected to the fourth uncoated region 115d of the second conductive layer 113.

A connecting portion 133 of the first adapting sheet 13a may be disposed on an outer side of a current collector 11 in a width direction Y, and the connecting portion 133 of the second adapting sheet 13b may be disposed on an outer side of the current collector 11 in the width direction Y.

At least one of the first adapting sheet 13a and the second adapting sheet 13b is connected to the electrode lead 14. In this embodiment, the electrode lead 14 is welded to the first adapting sheet 13a.

In this embodiment, the plurality of adapting sheet pieces 13 may increase conductive paths between the first conductive layer 112 and the second conductive layer 113, and the current-converging capability could be improved.

The first uncoated region 115a and the second uncoated region 115b are respectively located at two ends of the first conductive layer 112 in a length direction X. There is one coated region 114, which connects the first uncoated region 115a and the second uncoated region 115b. There is one coated region 114 of the first conductive layer 112, which may simplify the coating process.

The third uncoated region 115c and the fourth uncoated region 115d are respectively located at two ends of the second conductive layer 113 in a length direction X. There is one coated region 114, which connects the third uncoated region 115c and the fourth uncoated region 115d. There is one coated region 114 of the second conductive layer 113, which may simplify the coating process.

Figure 17:
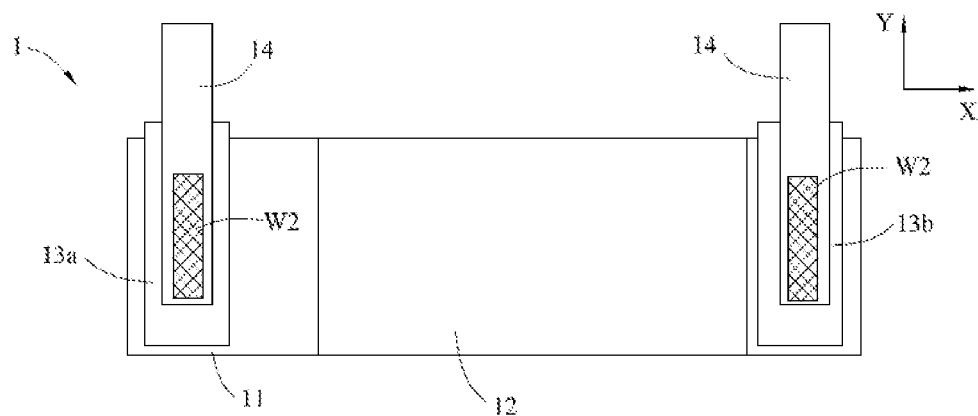
FIG. 17 is a schematic diagram of a sixth embodiment of an electrode member according to the present application.

FIG. 17 is a schematic diagram of a sixth embodiment of an electrode member according to the present application.

With reference to FIG. 17, compared with the fifth embodiment, in a sixth embodiment, a first adapting sheet 13a a second adapting sheet 13b are both connected to electrode leads 14. The two electrode leads 14 may improve the current-passing capability of the electrode member 1.

Figure 18:
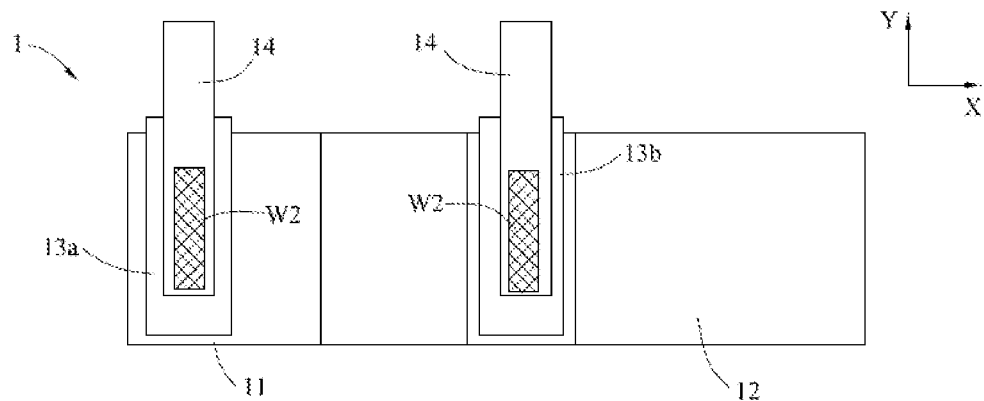
FIG. 18 is a schematic diagram of a seventh embodiment of an electrode member according to the present application.
Figure 19:
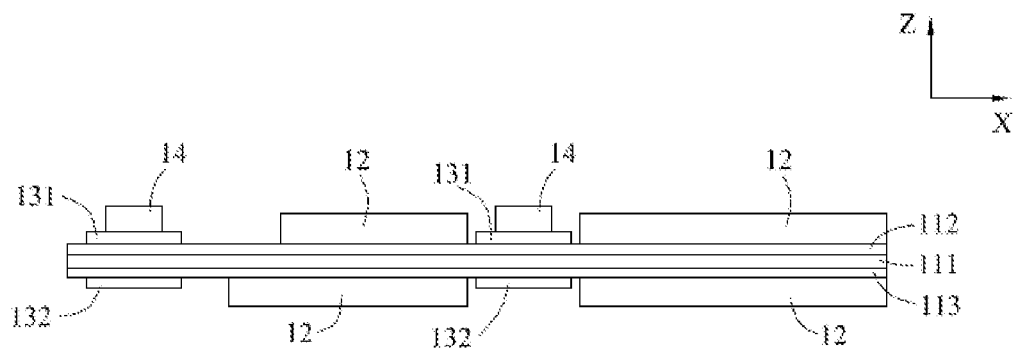
FIG. 19 is a front view of the electrode member of FIG. 18.

FIG. 18 is a schematic diagram of a seventh embodiment of an electrode member according to the present application. FIG. 19 is a front view of the electrode member of FIG. 18.

With reference to FIGS. 18 and 19, compared with the sixth embodiment, in a seventh embodiment, a second uncoated region 115b is located between two coated regions 114, and a fourth uncoated region 115d is located between two coated regions 114.

In this embodiment, there are a plurality of coated regions 114 of a first conductive layer 112, and a plurality of coated regions 114 of a second conductive layer 113.

Figure 20:
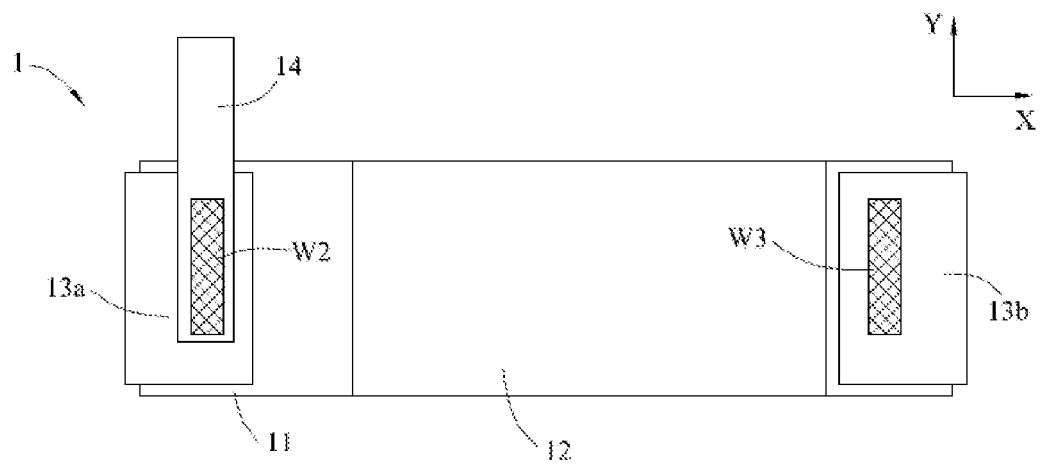
FIG. 20 is a schematic diagram of an eighth embodiment of an electrode member according to the present application.
Figure 21:
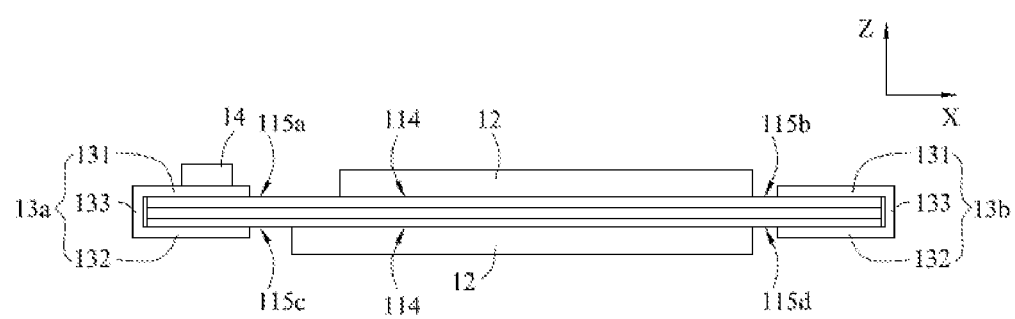
FIG. 21 is a front view of the electrode member of FIG. 20.

FIG. 20 is a schematic diagram of an eighth embodiment of an electrode member according to the present application. FIG. 21 is a front view of the electrode member of FIG. 20.

With reference to FIGS. 20-21, compared with the fifth embodiment, in an eighth embodiment, a structure of the adapting sheet 13 is different. Specifically, a connecting portion 133 of a first adapting sheet 13a may be disposed on an outer side of a current collector 11 in a length direction X, and the connecting portion 133 of a second adapting sheet 13b may be disposed on an outer side of the current collector 11 in the length direction X.

Figure 22:
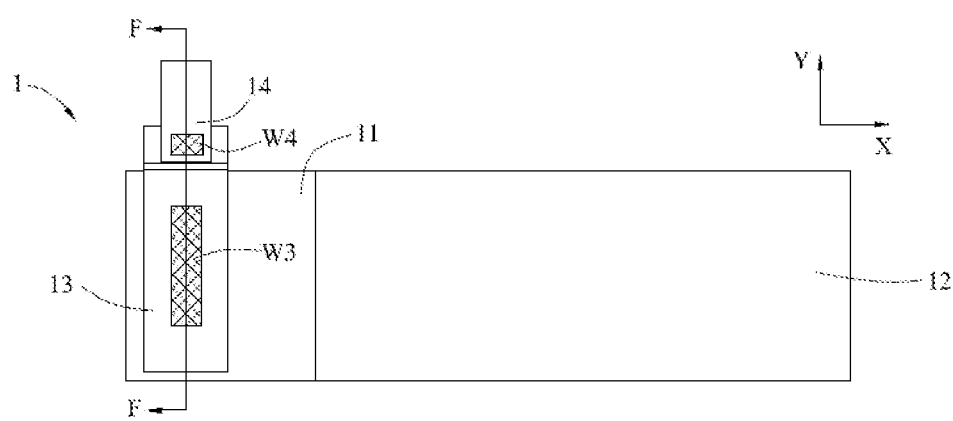
FIG. 22 is a schematic diagram of a ninth embodiment of an electrode member according to the present application.
Figure 23:
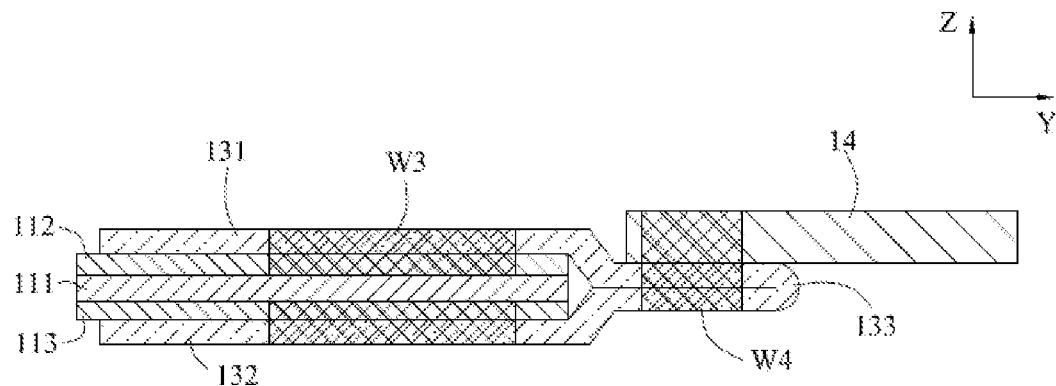
FIG. 23 is a sectional view of the electrode member of FIG. 22 taken along a line F-F.

FIG. 22 is a schematic diagram of a ninth embodiment of an electrode member according to the present application. FIG. 23 is a sectional view of the electrode member of FIG. 22 taken along a line F-F.

With reference to FIGS. 22-23, compared with the third embodiment, in a ninth embodiment, an electrode lead 14 is fixed to a connecting portion 133 by means of welding, bonding and riveting.

In some embodiments, the electrode lead 14 is welded to the connecting portion 133 to form a fourth welding zone W4, and a first conductive member 131 is welded to a first conductive layer 112 to form a third welding zone W3.

The electrode lead 14 is relatively thick, and welding will generate more heat. In this embodiment, the electrode lead 14 is only welded to the connecting portion 133 of the adapting sheet 13, which could reduce the heat transmitted to an insulating substrate 111 of a current collector 11.

Figure 24:
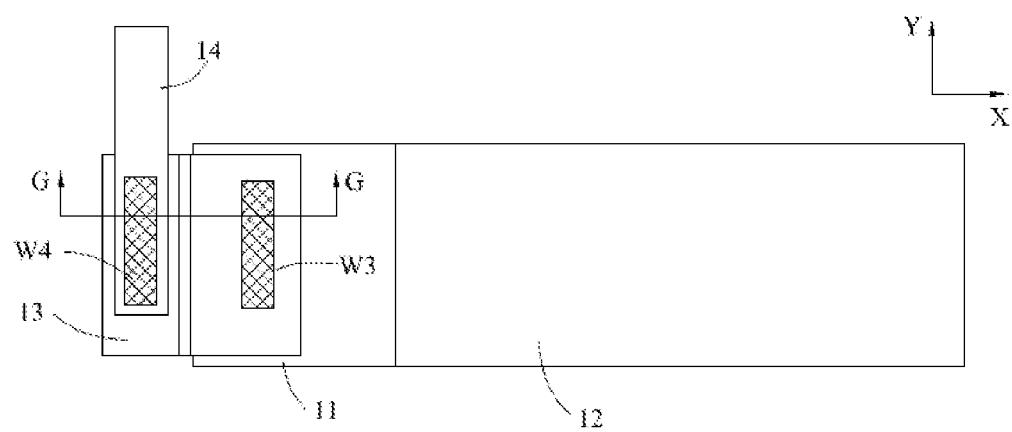
FIG. 24 is a schematic diagram of a tenth embodiment of an electrode member according to the present application.
Figure 25:
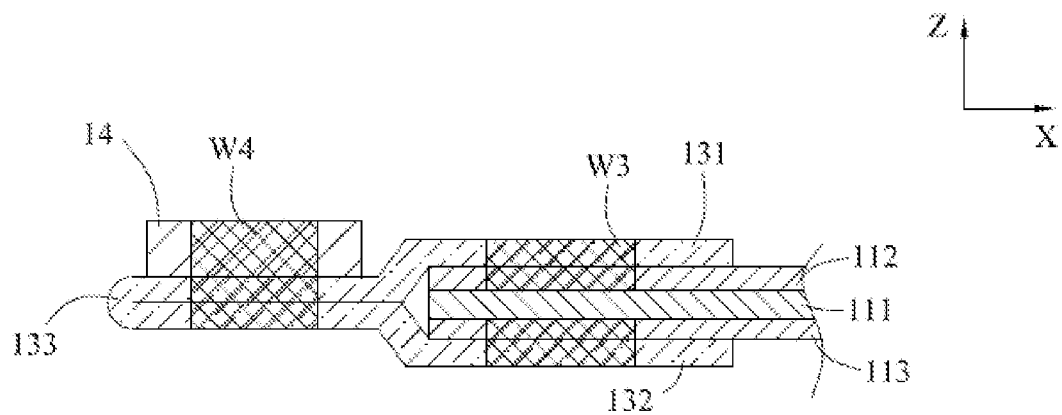
FIG. 25 is a sectional view of the electrode member of FIG. 24 taken along a line G-G.

FIG. 24 is a schematic diagram of a tenth embodiment of an electrode member according to the present application. FIG. 25 is a sectional view of the electrode member of FIG. 24 taken along a line G-G.

With reference to FIGS. 24-25, compared with the fourth embodiment, in a tenth embodiment, the electrode lead 14 is fixed to the connecting portion 133 by means of welding, bonding and riveting.

In some embodiments, a first conductive member 131 is welded to a first conductive layer 112 to form a third welding zone W3, and an electrode lead 14 is welded to a connecting portion 133 to form a fourth welding zone W4.

The electrode lead 14 is relatively thick, and welding will generate more heat. In this embodiment, the electrode lead 14 is only welded to the connecting portion 133 of the adapting sheet 13, which could reduce the heat transmitted to an insulating substrate 111 of a current collector 11. Meanwhile, the connecting portion 133 does not occupy space in a width direction Y, which could reduce the volume of the electrode assembly 6 and improve the energy density.

Figure 26:
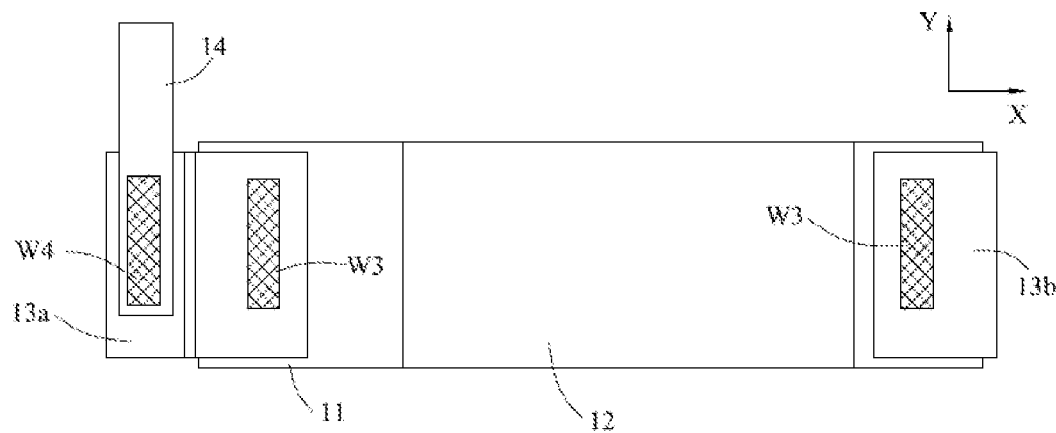
FIG. 26 is a schematic diagram of an eleventh embodiment of an electrode member according to the present application.
Figure 27:
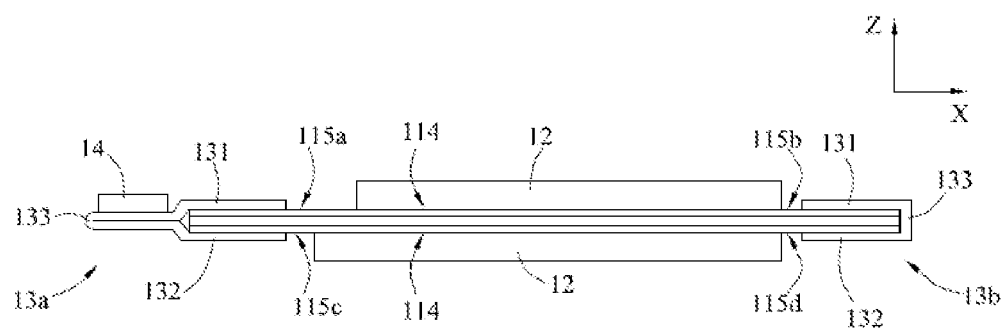
FIG. 27 is a front view of the electrode member of FIG. 26.

FIG. 26 is a schematic diagram of an eleventh embodiment of an electrode member according to the present application. FIG. 27 is a front view of the electrode member of FIG. 26.

Compared with the tenth embodiment, in an eleventh embodiment, there are a plurality of uncoated regions 115 of a first conductive layer 112, and there may be one or more coated regions 114 of the first conductive layer 112. In the first conductive layer 112, the uncoated region 115 and the coated region 114 are alternately arranged in a length direction X.

There are a plurality of uncoated regions 115 of a second conductive layer 113, and there may be one or more coated regions 114 of the second conductive layer 113. In the second conductive layer 113, the uncoated region 115 and the coated region 114 are alternately arranged in a length direction X.

The plurality of uncoated regions 115 of the first conductive layer 112 include a first uncoated region 115a and a second uncoated region 115b, and the plurality of uncoated regions 115 of the second conductive layer 113 include a third uncoated region 115c and a fourth uncoated region 115d.

The number of the adapting sheets 13 is plural, and a plurality of adapting sheets 13 include a first adapting sheet 13a and a second adapting sheet 13b. The first conductive member 131 of the first adapting sheet 13a is connected to the first uncoated region 115a of the first conductive layer 112, and the second conductive member 132 of the first adapting sheet 13a is connected to the third uncoated region 115c of the second conductive layer 113. The first conductive member 131 of the second adapting sheet 13b is connected to the second uncoated region 115b of the first conductive layer 112, and the second conductive member 132 of the second adapting sheet 13b is connected to the fourth uncoated region 115d of the second conductive layer 113.

A connecting portion 133 of the first adapting sheet 13a may be disposed on an outer side of a current collector 11 in a length direction X, and the connecting portion 133 of the second adapting sheet 13b may be disposed on an outer side of the current collector 11 in the length direction X.

At least one of the first adapting sheet 13a and the second adapting sheet 13b is connected to the electrode lead 14. In this embodiment, the electrode lead 14 is welded to the first adapting sheet 13a.

In this embodiment, the plurality of adapting sheet pieces 13 may increase conductive paths between the first conductive layer 112 and the second conductive layer 113, and the current-converging capability could be improved.

Figure 28:
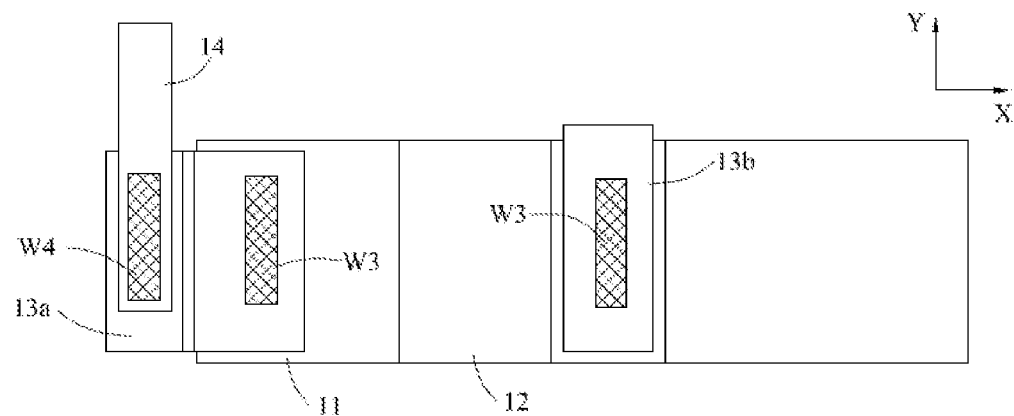
FIG. 28 is a schematic diagram of a twelfth embodiment of an electrode member according to the present application.
Figure 29:
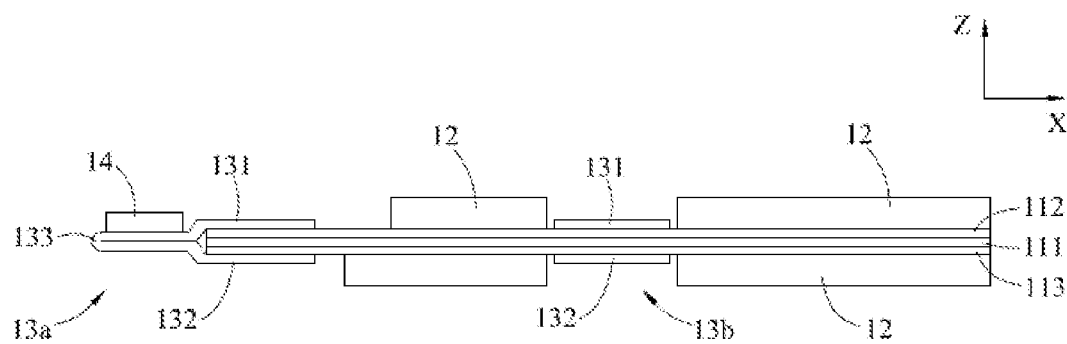
FIG. 29 is a front view of the electrode member of FIG. 28.

FIG. 28 is a schematic diagram of a twelfth embodiment of an electrode member according to the present application. FIG. 29 is a front view of the electrode member of FIG. 28.

With reference to FIGS. 2-29, compared with the eleventh embodiment, in a twelfth embodiment, a second uncoated region 115b is located between two coated regions 114, and a fourth uncoated region 115d is located between two coated regions 114.

In this embodiment, there are a plurality of coated regions 114 of a first conductive layer 112, and a plurality of coated regions 114 of a second conductive layer 113.

What is claimed is:

1. An electrode member, comprising a current collector, an active material layer, an adapting sheet, and an electrode lead;
    wherein the current collector comprises an insulating substrate, a first conductive layer, and a second conductive layer, and the first conductive layer and the second conductive layer are respectively disposed on two surfaces of the insulating substrate;
    the first conductive layer and the second conductive layer each comprise a coated region and an uncoated region, the coated region is coated with an active material layer, and the uncoated region is not coated with an active material layer, a size of the current collector in a length direction is larger than that in a width direction, and the uncoated region is located on a side of the coated region in a length direction;
    the adapting sheet comprises a first conductive member and a second conductive member, the first conductive member and the second conductive member are respectively connected to the uncoated region of the first conductive layer and the uncoated region of the second conductive layer, and the first conductive member is connected to the second conductive member; and
    the electrode lead is connected to the adapting sheet, and one end of the electrode lead in the width direction is beyond the uncoated region;
    wherein the adapting sheet further comprises a connecting portion, and the connecting portion is connected between the first conductive member and the second conductive member;
    the connecting portion is configured to be bent around an end portion of the uncoated region in the length direction, and the electrode lead is welded to the connecting portion to form a welding zone; wherein the first conductive member is welded to the first conductive layer to form a third welding zone, and the electrode lead is welded to the connecting portion of the adapting sheet to form a fourth welding zone in the length direction; or
    the connecting portion is configured to be bent around an end portion of the uncoated region in the width direction; and the electrode lead is welded to the connecting portion to form a welding zone; wherein the electrode lead is welded to the connecting portion of the adapting sheet to form a fourth welding zone in the width direction, and the first conductive member is welded to the first conductive layer to form a third welding zone.

2. The electrode member according to claim 1, wherein the electrode lead is connected to the first conductive member, and the electrode lead is not beyond the uncoated region in the length direction.

3. The electrode member according to claim 1, wherein a thickness of the electrode lead is greater than a thickness of the first conductive member.

4. The electrode member according to claim 1, wherein the uncoated region of the first conductive layer is located at an end portion of the first conductive layer in the length direction; and
    the uncoated region of the second conductive layer is located at an end portion of the second conductive layer in the length direction.

5. The electrode member according to claim 1, wherein
    a number of uncoated regions of the first conductive layer is plural, and the uncoated regions of the first conductive layer comprise a first uncoated region and a second uncoated region;
    a number of the uncoated regions of the second conductive layer is plural, and the uncoated regions of the second conductive layer comprise a third uncoated region and a fourth uncoated region;
    a number of adapting sheets is plural, and the adapting sheets comprise a first adapting sheet and a second adapting sheet;
    the first conductive member of the first adapting sheet is connected to the first uncoated region of the first conductive layer, and the second conductive member of the first adapting sheet is connected to the third uncoated region of the second conductive layer;
    the first conductive member of the second adapting sheet is connected to the second uncoated region of the first conductive layer, and the second conductive member of the second adapting sheet is connected to the fourth uncoated region of the second conductive layer; and
    at least one of the first adapting sheet and the second adapting sheet is connected to the electrode lead.

6. The electrode member according to claim 5, wherein
    the first uncoated region and the second uncoated region are respectively located at two ends of the first conductive layer in the length direction; and
    the third uncoated region and the fourth uncoated region are respectively located at two ends of the second conductive layer in the length direction.

7. A secondary battery, comprising an electrode assembly, and the electrode assembly comprising a separator and the electrode member according to claim 1.

8. The secondary battery according to claim 7,
    the separator and the electrode member are wound into an integral body along a central axis parallel to the width direction; and
    in the width direction, the separator is beyond the adapting sheet.

9. A battery module, comprising the secondary battery according to claim 7, and a number of the secondary batteries being plural.

10. An apparatus using a secondary battery as a power source, comprising one or more secondary batteries according to claim 7, the one or more secondary batteries being configured to provide electrical energy.

\* \* \* \* \*